United States Patent
Dalla et al.

(10) Patent No.: US 12,445,412 B2
(45) Date of Patent: Oct. 14, 2025

(54) AUTOMATED SERVICE WORKER INSTALLATION FOR CLIENT-INITIATED USER IDENTIFICATION AND DLP SCANNING

(71) Applicant: Palo Alto Networks, Inc., Santa Clara, CA (US)

(72) Inventors: Mohammed Mohsin Dalla, Bangalore (IN); Mrigank Sunjiv Tyagi, Bulandshahr (IN)

(73) Assignee: Palo Alto Networks, Inc., Santa Clara, CA (US)

( * ) Notice: Subject to any disclaimer, the term of this patent is extended or adjusted under 35 U.S.C. 154(b) by 116 days.

(21) Appl. No.: 18/396,932

(22) Filed: Dec. 27, 2023

(65) Prior Publication Data
US 2025/0219996 A1 Jul. 3, 2025

(51) Int. Cl.
*H04L 9/40* (2022.01)
*H04L 67/02* (2022.01)

(52) U.S. Cl.
CPC ........ *H04L 63/0245* (2013.01); *H04L 63/102* (2013.01); *H04L 63/1433* (2013.01); *H04L 63/168* (2013.01); *H04L 67/02* (2013.01)

(58) Field of Classification Search
CPC ... H04L 63/0245; H04L 63/102; H04L 67/02; H04L 63/1433; H04L 63/168
See application file for complete search history.

(56) References Cited

U.S. PATENT DOCUMENTS

| | | | |
|---|---|---|---|
| 9,349,016 B1 | 5/2016 | Brisebois et al. | |
| 9,842,315 B1* | 12/2017 | Raman | G06Q 10/107 |
| 12,323,389 B2* | 6/2025 | Jia | H04L 63/0263 |
| 2010/0082823 A1* | 4/2010 | Cui | H04L 67/14 |
| | | | 709/228 |

(Continued)

OTHER PUBLICATIONS

Palo Alto Networks, Inc., "Insert Username in HTTP Headers", [online], [retrieved on Nov. 19, 2023] Retrieved from the Internet: <https://docs.paloaltonetworks.com/pan-os/9-1/pan-os-admin/user-id/deploy-user-id-in-a-large-scale-network/insert-username-in-http-headers>, 2023, Palo Alto Networks, Inc., 4 pages.

*Primary Examiner* — Hadi S Armouche
(74) *Attorney, Agent, or Firm* — Gilliam IP PLLC (57) ABSTRACT

A cybersecurity appliance orchestrates registration and installation of a service worker by a web browser. The service worker intercepts and modifies requests sent by the web browser for a SaaS application with tenant/user information and/or DLP scanning results. The cybersecurity appliance orchestrates the service worker registration and installation by modifying responses to requests sent by the web browser. Once installed, the service worker determines the logged in user for the session and modifies outbound requests to attach the user information (e.g., account name/email address) thereto. The service worker can also or alternatively monitor for input of data into web pages, designate the data for data loss prevention (DLP) scanning, and modify outbound requests to attach the DLP scanning result. The cybersecurity appliance receives the user information and/or DLP scanning results with requests sent by (Continued)

the web browser since the user information and/or results were attached to the requests client-side.

20 Claims, 6 Drawing Sheets

(56) References Cited

U.S. PATENT DOCUMENTS

| | | | | |
|---|---|---|---|---|
| 2013/0276062 | A1* | 10/2013 | Sarawat | H04W 4/18 |
| | | | | 726/3 |
| 2020/0120159 | A1* | 4/2020 | Momchilov | G06F 9/4856 |
| 2022/0263708 | A1* | 8/2022 | Ramachandran | H04L 43/04 |
| 2024/0296231 | A1* | 9/2024 | Ramanan | G06F 21/577 |
| 2025/0007882 | A1* | 1/2025 | Akhtar | H04L 63/0236 |
| 2025/0111073 | A1* | 4/2025 | Ho | G06F 21/6218 |

* cited by examiner

AUTOMATED SERVICE WORKER INSTALLATION FOR CLIENT-INITIATED USER IDENTIFICATION AND DLP SCANNING

BACKGROUND

The disclosure generally relates transmission of digital information (e.g., CPC subclass H04L) and to network architectures or network communication protocols for network security (e.g., CPC subclass H04L 63/00).

Service workers are JavaScript® workers that act as proxies between web browsers and web servers. Service workers are implemented with scripts that are registered and installed to a web browser but are executed independently of the web browser. Once registered and installed, a service worker can intercept and modify Hypertext Transfer Protocol (HTTP) requests and responses sent between the web browser and a web server via the service worker application programming interface (API). Service workers maintain a local cache into which it can store assets identified from HTTP responses. Assets stored in the cache can be inserted into HTTP requests or supplied in responses generated client-side, such as to support responding to requests offline or to otherwise enhance website or application performance.

Data loss prevention (DLP) tools are used by organizations to prevent the unauthorized or unsafe exposure of data to those outside of the organization. DLP tools work to prevent loss of data by monitoring data in motion, data in use, and data at rest (collectively "data"). Data in motion refers to data that is actively in transit (e.g., over a network) between locations. Data in use refers to data being accessed, processed, or otherwise manipulated in memory. Data at rest refers to data in storage that is not actively in transit or being accessed.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

Tenants (e.g., organizations, enterprises, etc.) of a cloud platform or cloud service provider commonly utilize a multitude of Software-as-a-Service (SaaS) applications. Security personnel of a tenant (e.g., security administrators) may desire to configure different security policies for different SaaS applications to provide granular control over user access across SaaS applications. However, since the particular tenant associated with a session associated with a SaaS application often cannot be discerned from network traffic of the SaaS application alone, a cybersecurity appliance (e.g., firewall) captures user account information obtained during initial authentication of the user for a SaaS application and caches the user account information in association with the session identifier (ID). However, maintaining a centralized cache of accounts and session IDs can incur high overhead for the cybersecurity appliance. Additionally, user account information can be communicated in various manners across different SaaS applications, such as in different data fields, so adding support for per-SaaS application security policies for new SaaS applications may consume extensive resources for research and development. Variability across SaaS applications also has implications for inline DLP scanning. SaaS applications can be built upon a variety of different protocols, some of which may be custom (e.g., proprietary), so DLP tools cannot employ a "one size fits all" approach for decoding network traffic of different SaaS applications.

Disclosed herein are techniques for client-side determination and incorporation of user identifying information in network traffic outbound for a cybersecurity appliance as well as inline DLP scanning that overcomes the above challenges. The disclosed solution utilizes a service worker to intercept and modify outbound requests with user information and/or DLP scanning results. The cybersecurity appliance orchestrates registration and installation of the service worker by the web browser by modifying responses to requests sent by the web browser. The service worker is installed once per session between the web browser and the cybersecurity appliance, thus incurring minimal overhead for the cybersecurity appliance. The service worker logic is also generally applicable across SaaS applications, which lessens the load on research and development teams when support for new SaaS applications is to be added for either multi-SaaS application security policy configuration or DLP.

Once installed, as a user(s) logs into and accesses resources of a SaaS application, the service worker determines the user logged into the SaaS application, such as based on a user identifier or account name (e.g., email address), and caches the user information in association with the corresponding SaaS application session ID or other key for the SaaS application session. The service worker intercepts requests sent during the user's session with the SaaS application and modifies each request to incorporate the user information that it cached for the session. The cybersecurity appliance can thus obtain the user information from requests sent by the web browser rather than maintaining the user information and SaaS application session ID mappings itself. Additionally, the service worker monitors web pages of supported SaaS applications for input of data captured in HyperText Markup Language (HTML) elements of the web pages. When the user inputs data into one of these HTML elements, the service worker obtains a copy of the data, designates the data for DLP scanning (e.g., to an external DLP scanning service), and modifies the next intercepted request to indicate the result of DLP scanning. The cybersecurity appliance therefore has the result of the DLP scan performed for the data upon receiving the request and can determine and perform an appropriate action without any additional processing or decoding of network traffic.

Example Illustrations

Figure 1:
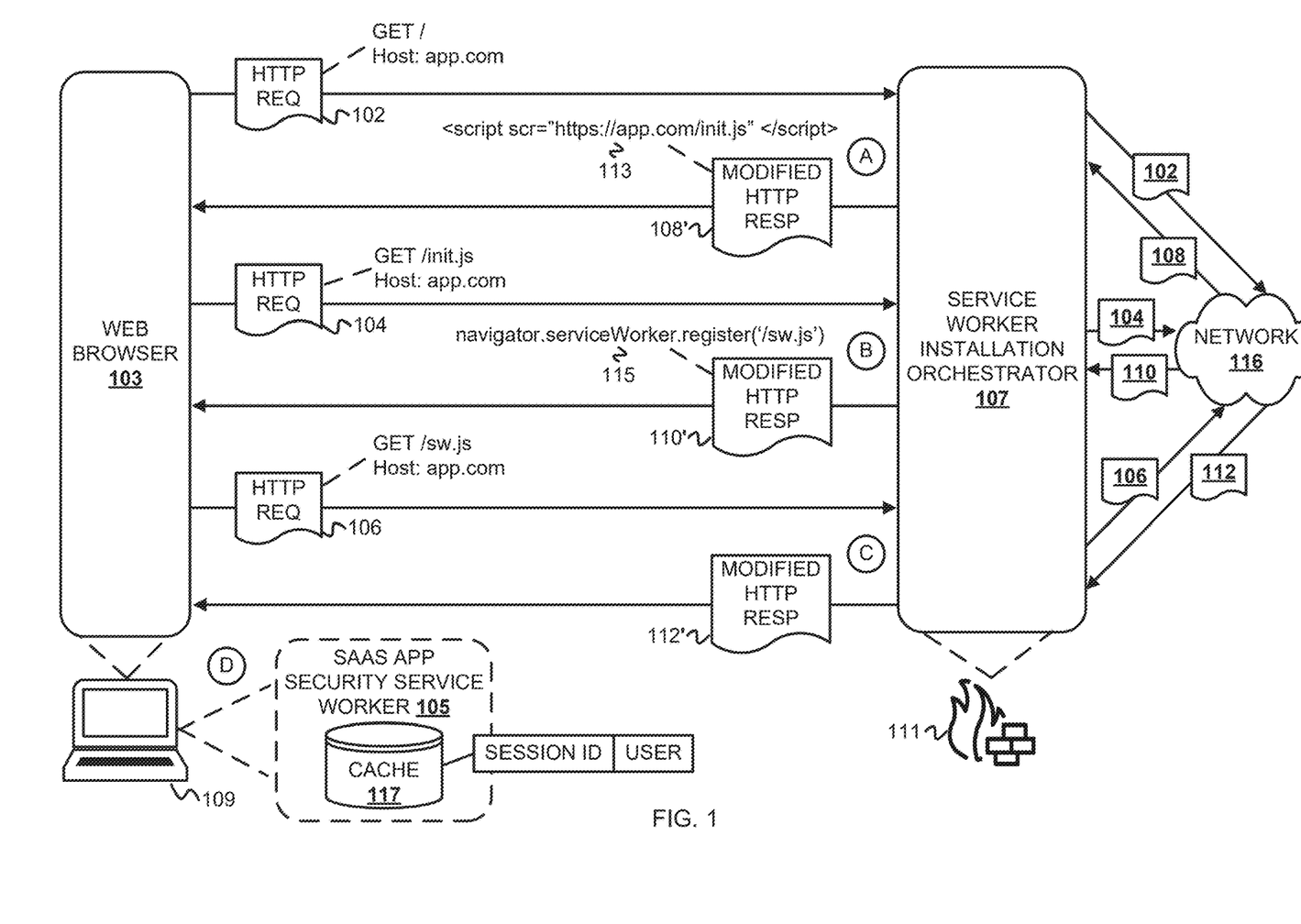
FIG. 1 is a conceptual diagram of orchestrating installation of a service worker for SaaS application security.

FIG. 1 is a conceptual diagram of orchestrating installation of a service worker for SaaS application security. An endpoint device 109 has a web browser 103 installed thereon. The web browser 103 can be any web browser that supports service workers. A cybersecurity appliance 111 enforces security policies for the endpoint device 109 based on network traffic sent to and from the endpoint device 109, including that sent over a network 116 (e.g., the Internet). The network 116 may be external to a network of a tenant to which the endpoint device 109 has connected, where the endpoint device 109 is associated with the tenant and the cybersecurity appliance 111 secures the tenant's network. The cybersecurity appliance 111 can be a hardware or software cybersecurity appliance such as a firewall. A service worker installation orchestrator ("installation orchestrator") 107 executes on the cybersecurity appliance 111. The installation orchestrator 107 orchestrates installation of service workers for web browsers compatible with service workers.

FIG. 1 is annotated with a series of letters A-D. Each letter represents a stage of one or more operations. Although these stages are ordered for this example, the stages illustrate one example to aid in understanding this disclosure and should not be used to limit the claims. Subject matter falling within the scope of the claims can vary from what is illustrated.

At stage A, the installation orchestrator 107 receives an HTTP request 102 from the web browser 103 and responds with a modified HTTP response 108' into which it has injected a script 113. The HTTP request 102 issued by the web browser is a GET request that indicates a uniform resource locator (URL) of a SaaS application, referred to as "app.com" in this example. The cybersecurity appliance 111 forwards the HTTP request 102 over the network 116 to its destination (e.g., a server used by the SaaS application) and obtains in response an HTTP response 108, which it modifies by inserting the script 113 to generate the modified HTTP response 108'. The script 113 comprises an HTML script tag and at least indicates a URL of an external JavaScript file as a source attribute. In this example, the URL specified by the source attribute of the script is "https://app.com/init.js". The installation orchestrator 107 injects the script 113 into the HTTP response 108 to generate the modified HTTP response 108'. To illustrate, the cybersecurity appliance 111 can forward the HTTP request 102 to a web server and obtain the HTTP response 108, and the installation orchestrator 107 modifies the HTTP response 108 by injecting the script 113 to generate the modified HTTP response 108'.

At stage B, the installation orchestrator 107 receives an HTTP request 104 from the web browser 103 and responds with a modified HTTP response 110' that includes program code 115 to register a SaaS application security service worker ("service worker") 105 for the web browser 103. The HTTP request 104 issued by the web browser 103 is an HTTP GET request for the URL indicated in the script 113. The cybersecurity appliance 111 forwards the HTTP request 104 over the network 116 to its destination (e.g., a presumed location of the file indicated in the script 113) and obtains in response an HTTP response 110, which it modifies by inserting the program code 115 to generate the modified HTTP response 110'. The program code 115 comprises JavaScript code at least including the register( ) function of the service worker API. The registration function included in the program code 115 indicates a JavaScript file "sw.js" that implements the service worker 105 as a parameter value passed into the function. The installation orchestrator 107 can also modify the HTTP response 108 by replacing a status code indicated therein to generate the modified HTTP response 108. For instance, the HTTP response 110 may indicate a redirect status code (e.g., HTTP 301 Moved Permanently) that the installation orchestrator 107 replaces with a 200 OK status code to generate the modified HTTP response 110'.

At stage C, the installation orchestrator 107 receives an HTTP request 106 that indicates the service worker 105 file and responds with a modified HTTP response 112' that includes program code of the service worker 105. The HTTP request 106 is another GET request triggered by the registration of the service worker 105 at stage B. The cybersecurity appliance 111 forwards the HTTP request 106 over the network 116 to its destination and obtains in response an HTTP response 112, which it modifies by inserting JavaScript program code of the service worker 105 to generate the modified HTTP response 112'.

At stage D, the web browser 103 installs the service worker 105. Installation of the service worker 105 is triggered by receipt of the modified HTTP response 112. Once installed and activated, the service worker 105 executes alongside the web browser 103 and can thus intercept and modify HTTP requests sent from the web browser 103 and/or HTTP responses sent to the web browser 103. The service worker 105 is installed with a cache 117 that maps SaaS application session IDs (or other keys that identify sessions) to indications of users logged in and/or authenticated for the sessions. User information that the service worker 105 caches can include user identifier, user account name (e.g., email address), etc. As is now described in reference to FIG. 2, the service worker 105 modifies HTTP requests sent by the web browser 103 to attach a header(s) that comprises cached user information that is mapped to the respective session.

Figure 2:
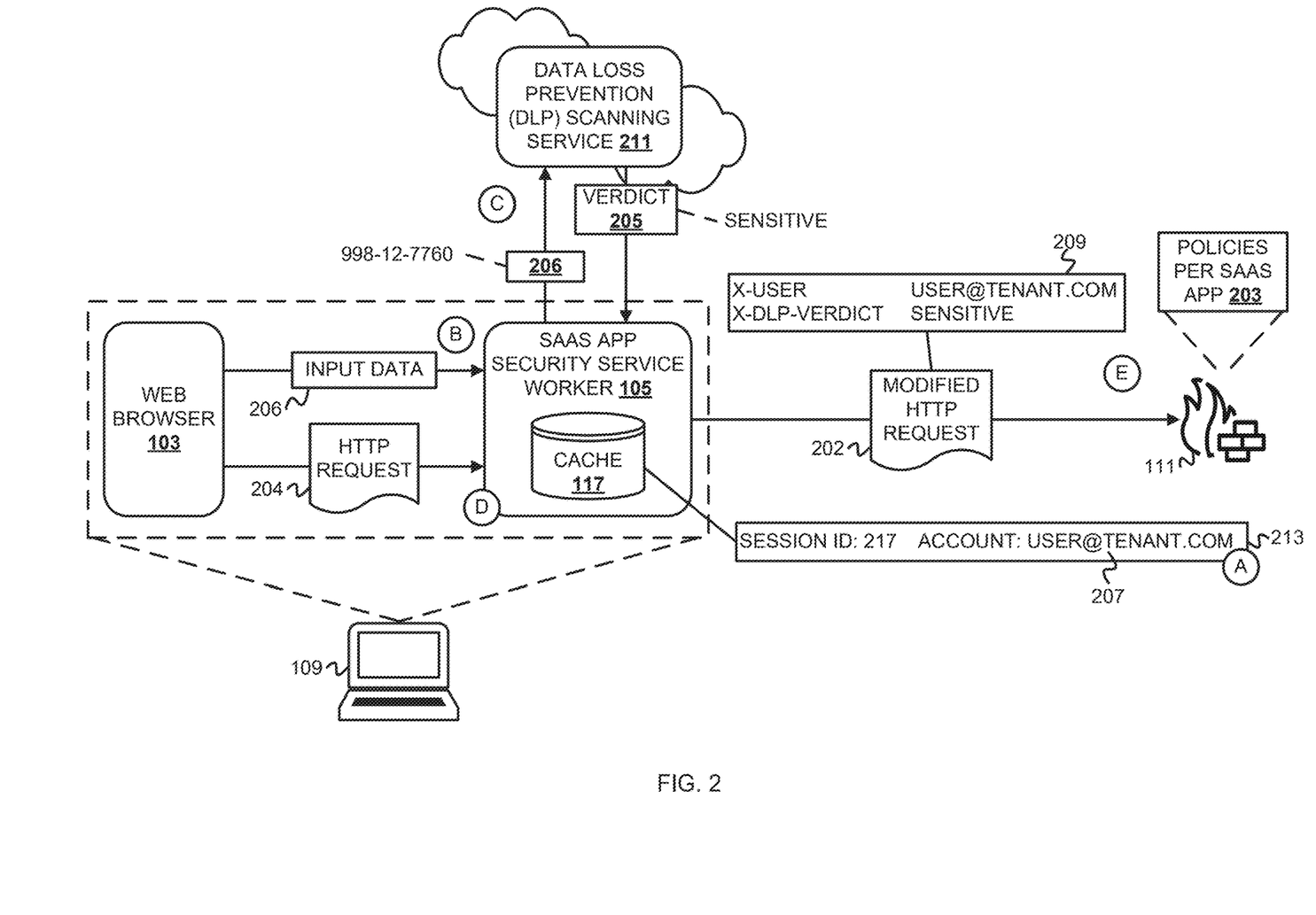
FIG. 2 is a conceptual diagram of utilizing a service worker for client-side determination of user identity information and initiation of DLP scanning.

FIG. 2 is a conceptual diagram of utilizing a service worker for client-side determination of user identity information and initiation of DLP scanning. FIG. 2 depicts the service worker 105 executing alongside the web browser 103. The service worker 105 has been configured to intercept fetch events by the web browser 103 (i.e., via an event listener for fetch events) to retrieve web pages of a SaaS application. The service worker 105 also monitors one or more input elements of web pages of the SaaS application (e.g., HTML input elements) for data input via the endpoint device 109, such as data input by a user of the endpoint device 109.

FIG. 2 is annotated with a series of letters A-E. Each letter represents a stage of one or more operations. Although these stages are ordered for this example, the stages illustrate one example to aid in understanding this disclosure and should not be used to limit the claims. Subject matter falling within the scope of the claims can vary from what is illustrated.

At stage A, the service worker 105 determines an account name 207 of a user logged into the SaaS application. Determination of the account name 207 occurs as a result of a session being created for the SaaS application, such as after a user has been authenticated and logged into the SaaS application. The service worker 105 may have determined the account name 207 based on determining a value of an element of the SaaS application's homepage or landing page that stores the account name of the logged in user, for instance. The service worker 105 caches the account name 207 along with an identifier of the SaaS application session in the cache 117. This example depicts the corresponding entry of the cache 117 as comprising the session ID "217" and the account name 207 as "user@tenant.com".

At stage B, the service worker 105 detects input of data 206 by a user of the endpoint device 109 to the SaaS application. The service worker 105 monitors input elements of web pages of the SaaS application for input of data by users. To monitor input elements of web pages of the SaaS application, the service worker 105 modifies responses forwarded to the web browser 103 to incorporate custom program code (e.g., JavaScript code) that adds event listeners by which the service worker 105 can indirectly access and/or detect manipulations to the web page's document object model (DOM). Event listeners can be added for keyboard events, click events, or other events that trigger the event listener when user input that modifies the web page via its DOM is detected, and the web browser 103 can provide input obtained via the event listener to the service worker 105. Monitored input elements that the service worker 105 monitors via such event listeners can be any HTML elements into which data (e.g., text, files, etc.) can be inserted by users based on user interaction with the web pages through typing, clicking, etc. The service worker 105 obtains the data 206 based on detecting input of the data 206 into the web page via the monitored HTML element. The data 206 comprises an example string of numbers, "998-12-7760." The data 206 can be a copy of the actual data supplied by the user that the web browser 103 has passed to the service worker 105.

At stage C, the service worker 105 sends the data 206 to a DLP scanning service 211. In this example, the DLP scanning service 211 is depicted as a cloud-based service with which the service worker 105 can communicate (e.g., via a secure communication connection established therebetween). The service worker 105 communicates the data 206 to the DLP scanning service 211, such as via an API of the DLP scanning service 211. The DLP scanning service 211 performs a DLP scan to determine if the data 206 is sensitive and returns to the service worker 105 a verdict 205. This example depicts the verdict 205 as indicating that the data is sensitive. For example, the DLP scanning service 211 may have a policy to determine that any data matching the pattern of a social security number (i.e., XXX-XX-XXXX) is potentially sensitive. The DLP scanning service 211 may provide other data and/or metadata of the DLP scan to the service worker 105 with the verdict 205, such as the pattern of sensitive data that the data 206 matched.

At stage D, the service worker 105 intercepts an HTTP request 204 issued by the web browser 103 and modifies the HTTP request 204 with the verdict 205 and the account name 207. The service worker 105 intercepts the HTTP request 204 based on the web browser 103 issuing a network request (e.g., via the fetch method) that the service worker 105 is configured to intercept. The service worker 105 can modify the HTTP request 204 by adding request headers 209 that include the account name 207 and the verdict 205. The service worker 105 may modify the HTTP request 204 to include additional data and/or metadata of the verdict 205 that was communicated by the DLP scanning service 211. In this example, the request headers 209 are X-headers, though in implementations, other custom header types that can be appended/attached to HTTP requests may be used. The service worker 105 then forwards the modified HTTP request 202 to the cybersecurity appliance 111.

At stage E, the cybersecurity appliance 111 evaluates the modified HTTP request 202, including the user account name and DLP verdict identified from the request headers 209, for policy enforcement. The cybersecurity appliance 111 has been configured with policies per SaaS application ("policies") 203. The policies 203 may have been defined by the tenant such that different policies can be defined for different SaaS applications—in other words, the policy(ies) that is enforced for network traffic can depend on the SaaS application to which the network traffic corresponds. The policies 203 can include rules for handling network traffic based on its DLP verdict (i.e., whether the network traffic comprises sensitive data) and/or rules for handling network traffic based on user/tenant information associated with network traffic. To illustrate, a tenant may have defined a rule that requests to an email SaaS application that are associated with a user's personal account, or an account not associated with the tenant, should be denied or blocked. For the rule(s) of the policies 203 that specify user/tenant information, the cybersecurity appliance 111 can determine the user or account associated with the modified HTTP request 202, or the user associated with the account name 207, from the corresponding one of the request headers 209 so that the rule(s) can be enforced accordingly. In this example, since the HTTP request 202 comprises sensitive data (i.e., the data 206), the cybersecurity appliance 111 can be assumed to block the HTTP request 202 in accordance with the policies 203.

Figure 3:
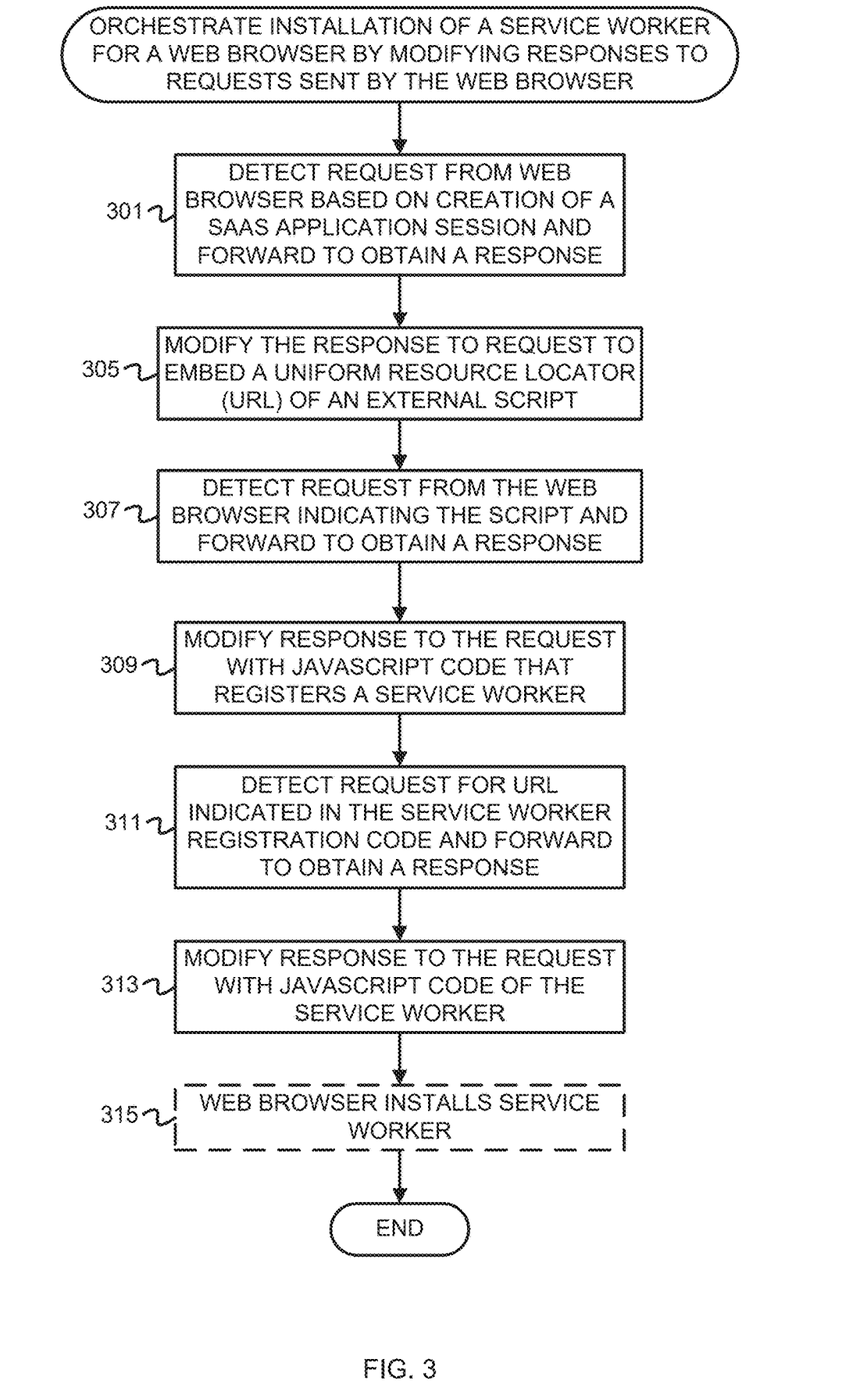
FIG. 3 is a flowchart of example operations for orchestrating installation of a service worker for a web browser by modifying responses to requests sent by the web browser.
Figure 4:
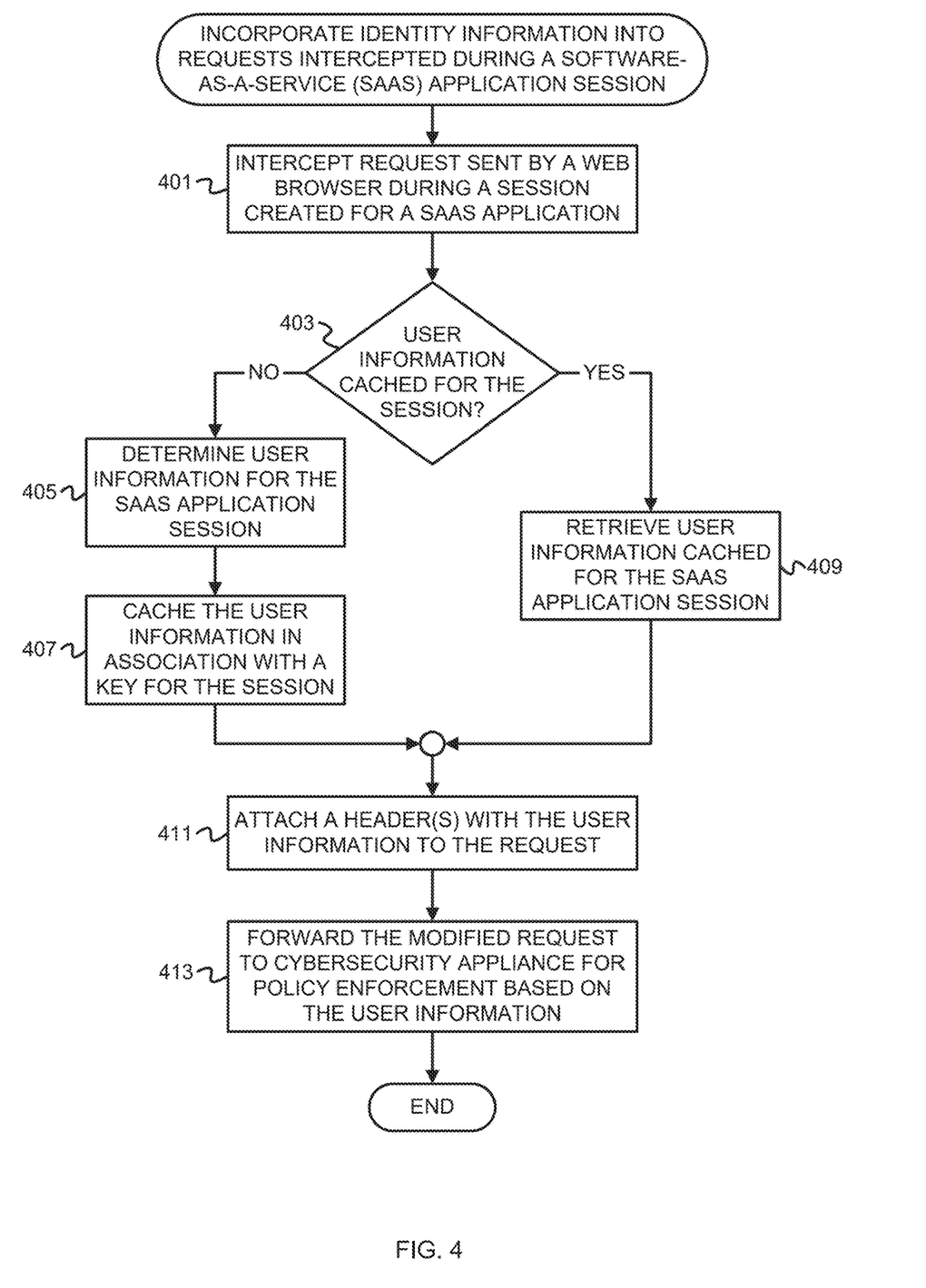
FIG. 4 is a flowchart of example operations for incorporating user information into requests intercepted during a SaaS application session.
Figure 5:
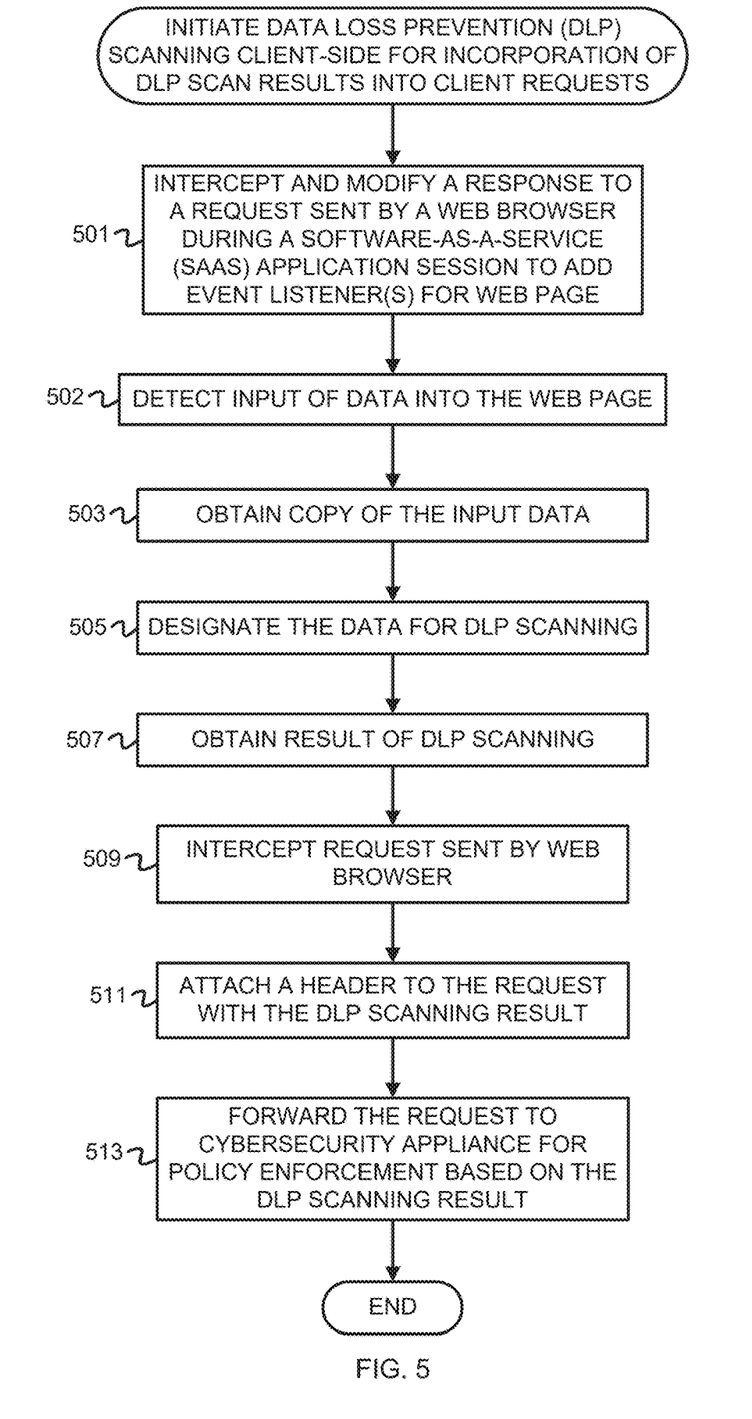
FIG. 5 is a flowchart of example operations initiating DLP scanning client-side for incorporation of DLP scan results into client requests.

FIGS. 3-5 are flowcharts of example operations. The example operations are described with reference to a service worker installation orchestrator and a SaaS application security service worker (hereinafter "the installation orchestrator" and "the service worker," respectively) for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for orchestrating installation of a service worker for a web browser by modifying responses to requests sent by the web browser. The web browser is one that is compatible with service workers. The example operations are described with reference to the installation orchestrator, which executes on a cybersecurity appliance. The cybersecurity appliance may be hardware or software (e.g., a hardware or cloud-based firewall). As described below, requests and responses are generally HTTP requests and HTTP responses.

At block 301, the installation orchestrator detects a request from a web browser based on creation of a SaaS application session and forwards the request to obtain a response. The SaaS application session is created for a user of the SaaS application who has logged in (i.e., based on successful authentication of the user). The request may be the first HTTP request sent to the cybersecurity device after successful authentication of the user. The installation orchestrator forwards the request to its destination and obtains a response to the request. Subsequent operations assume that the request is valid (i.e., does not return an error code).

At block 305, the installation orchestrator modifies the response to the request to embed a URL of an external script (e.g., one contained in a JavaScript file). The installation orchestrator can embed the URL by injecting an HTML script element that indicates the URL of the external JavaScript file as a "src" attribute of the script element. The URL can be determined by appending the name of the JavaScript file (e.g., "init.js" as in FIG. 1) to the SaaS application's URL in a URL path, which the installation orchestrator can determine based on a header of the request. To illustrate, referring to FIG. 1, the installation orchestrator can append a URL path comprising the file name "init.js" to the URL of the SaaS application "https://app.com". The installation orchestrator then forwards the modified response to the web browser.

At block 307, the installation orchestrator detects a request from the web browser that indicates the URL of the external script and forwards the request to obtain a response. The request may be an HTTP GET request indicating the URL of the script provided to the web browser. Forwarding the request to its destination, or the presumed location of the file corresponding to the URL, should elicit a response to the request.

At block 309, the installation orchestrator modifies a response to the request with JavaScript code that registers a service worker. The response may be an HTTP response with a redirect status code (e.g., 301 Moved Permanently) that resulted from attempting to serve the request for the external JavaScript file. The installation orchestrator modifies the response to include JavaScript code to register the service worker via a URL of the JavaScript file that implements the service worker. The service worker registration code comprises the register( ) function of the service worker API that indicates the URL of the service worker script as a parameter value. The service worker registration code may further specify a scope of the service worker in another parameter value (e.g., the "./" scope). The installation orchestrator also modifies the response header to at least replace the status code with one that indicates a success (e.g., 200 OK). The installation orchestrator then forwards the modified response to the web browser.

At block 311, the installation orchestrator detects a request for the URL indicated in the service worker registration code and forwards the request to obtain a response. The request may be an HTTP GET request to retrieve the resource (i.e., the JavaScript file) corresponding to the URL. Forwarding the request to its destination, or the presumed location of the file corresponding to the URL, should elicit a response to the request.

At block 313, the installation orchestrator modifies the response to the request with JavaScript code of the service worker. The installation orchestrator modifies the response to include the program code that implements the service worker so it can be installed and executed alongside the web browser. The installation orchestrator also can modify the response header to at least replace the status code with one that indicates a success (e.g., 200 OK). The installation orchestrator then forwards the modified response to the web browser.

At block 315, the web browser installs the service worker. Block 315 is depicted in dashed lines to indicate that service worker installation is performed client-side (i.e., by the web browser). The service worker can intercept and modify responses as described below once it has been registered and installed by the web browser.

Installation of a service worker can occur once per session created by the cybersecurity appliance for communications originating from and destined to the web browser. The service worker thus will be active during the remainder of the session even as new browser tabs are opened, as new SaaS application sessions are created, or as new SaaS applications are accessed. Additionally, the installation orchestrator can launch service worker registration and installation for the web browser as described in reference to FIG. 3 upon determining that the service worker has not yet been installed for the session. This determination can be made based on the installation orchestrator determining that the first request sent during the session (i.e., as described in reference to block 301) does not include a custom header that the service worker is configured to append to requests.

FIG. 4 is a flowchart of example operations for incorporating user information into requests intercepted during a SaaS application session. Incorporating user information into intercepted requests informs a cybersecurity appliance (e.g., a firewall) of the user associated with the session so that rules of a security policy that allow or deny access to certain users, such as those using SaaS application accounts associated with a tenant versus those using accounts not associated with the tenant, can be enforced accordingly. The example operations assume that a web browser has already registered and installed a service worker as described above.

At block 401, the service worker intercepts a request sent by a web browser during a session created for a SaaS application. The session created for the SaaS application refers to the session created as a result of a user logging into the SaaS application (e.g., based on successful user authentication). The request is an HTTP request.

At block 403, the service worker determines if user information has been cached for the session. The service worker caches user information in association with a key for the corresponding session with the SaaS application. The key uniquely identifies the session and may be determined based on information associated with intercepted requests (e.g., from a cookie identified from the HTTP header). The service worker performs a lookup in the cache for the key of the session with which the request is associated and determines if the lookup results in a hit (i.e., retrieves user information). If user information has not yet been cached for the session, operations continue at block 405. If user information has been cached for the session, operations continue at block 409.

At block 405, the service worker determines user information for the SaaS application session. The user information determined for the SaaS application session reflects the user logged in for the session. The service worker can obtain the user information from one or more elements of the SaaS application's web page, such as an element that displays a user account name, user identifier, etc. The service worker may have been preconfigured with an indication of the web page element(s) from which user information should be extracted.

At block 407, the service worker caches the user information in association with the key for the session. The service worker stores the user information determined for the session and the associated key for the session (e.g., the session identifier) in its cache. Subsequent cache lookups as the service worker intercepts requests during the SaaS application session will yield a cache hit that produces the user information maintained for the session.

At block 409, the service worker retrieves the identity information cached for the SaaS application session. The service worker performs a cache lookup with the key used for the session (e.g., that it determines based on the intercepted request) and retrieves the corresponding user information.

At block 411, the service worker attaches a header(s) with the user information to the request. The service worker attaches one or more custom headers to the request, each of which carries user information determined for the session. The custom headers may be X-headers. As an example, the service worker can attach an X-header that stores an account name (e.g., email address) cached for the session to the request.

At block 413, the service worker forwards the modified request to the cybersecurity appliance for policy enforcement based on the user information. Upon receipt of the modified request, the cybersecurity appliance can determine the user information from the custom header(s) and evaluate the user information based on one or more rules of the security policy that informs whether to allow or deny the request. One or more rules of the security policy can indicate user information, such as by specifying criteria for user information that indicate groups of users (e.g., groups of users known to be associated with the tenant), and an action to take for requests having attached user information that is determined to satisfy or not satisfy the criteria for user information indicated in the rule(s). Returning to the previous example, the cybersecurity appliance may have been configured with a rule to allow requests from the tenant for the SaaS application (e.g., requests originating from users having an account registered with the tenant), to deny/block requests from unknown users that are not associated with the tenant (e.g., personal accounts), etc. The cybersecurity appliance can thus evaluate the user information based on the security policy to determine whether the request is allowed based on the user from which the request originated.

In implementations, a service worker can be compatible with multiple different SaaS applications. In these cases, the service worker can identify the SaaS application associated with the session as part of determining user information for the session. This is because the elements that store user information can vary across SaaS applications. The service worker can thus comprise functionality for determining user information for a plurality of different SaaS applications. The service worker can identify the SaaS application based on the request header (e.g., based on the host indicated in the HTTP request header) and then determine the elements from which the user information should be determined accordingly.

FIG. 5 is a flowchart of example operations initiating DLP scanning client-side for incorporation of DLP scan results into client requests. The example operations assume that a web browser has already registered and installed a service worker as described above.

At block 501, the service worker intercepts and modifies a response to a request sent by the web browser during a SaaS application session to add one or more event listeners for a web page. During a session with a SaaS application established for a user, when the web browser sends a request, the service worker obtains a response (e.g., an HTTP request and response, respectively). The service worker may intercept and forward the request to its destination after appending user information associated with the session to the request as described in reference to FIG. 4. The service worker intercepts the response to the request and modifies the response to incorporate program code that monitors for input to the corresponding web page by the user. The service worker may, for instance, append to the response JavaScript code that comprises one or more event listeners for user input events, such as keyboard events, where the web browser provides the captured input to the service worker. This allows the service worker to indirectly detect manipulation of the web page's DOM caused by user input events for the web page.

At block 502, the service worker detects input of data into the web page. The service worker detects input of the data based on one of the event listeners appended to the webpage capturing user input.

At block 503, the service worker obtains a copy of the input data. The copy of the input data can be a copy of the input text, a path to an uploaded file, etc.

At block 505, the service worker designates the data for DLP scanning. The service worker can utilize an external DLP service that scans data supplied thereto, where a secure communication connection has been established between the service worker and the DLP service. Designating the data for DLP scanning can thus include requesting that the DLP service scan the data (e.g., via an API of the DLP service).

At block 507, the service worker obtains a result of the DLP scanning. The service worker may obtain the result of the DLP scanning as a response to the request issued to the external DLP service. The result of DLP scanning indicates a verdict as to whether the data is sensitive or otherwise should not be transmitted outside of the tenant's network. The result of the DLP scanning may further include other data and/or metadata of the DLP scanning result, such as a pattern of sensitive data to which the input data matched, a confidence level in the verdict, etc.

At block 509, the service worker intercepts a request sent by the web browser. The request is the first HTTP request intercepted after the input data was designated for DLP scanning.

At block 511, the service worker attaches a header to the request with the DLP scanning result. The service worker attaches to the request at least a first custom header such as an X-header that stores a verdict of the DLP scanning indicating whether the data is sensitive. The service worker may also include other data and/or metadata of the DLP scanning result in the custom header or attach one or more additional custom headers (e.g., an additional X-header(s)) that include the other data and/or metadata.

At block 513, the service worker forwards the request to the cybersecurity appliance for policy enforcement based on the DLP scanning result. Upon receipt of the modified request, the cybersecurity appliance can determine whether the request comprises sensitive data from the custom header (s) and enforce one or more rules of the security policy accordingly. For instance, the cybersecurity appliance may be configured with a rule to deny/block requests that comprise sensitive data.

In implementations where an external DLP service is used for DLP scanning, the service worker may intercept a request to which a DLP scanning result should be attached before the DLP scanning result is actually obtained (i.e., as described at blocks 509 and 507, respectively). In such cases, the service worker may wait to modify the request until the DLP scanning result is returned to the service worker. The example operations at block 507 and 509 can thus be performed in the opposite order as that depicted in FIG. 5.

The service worker can perform example operations of FIGS. 4 and 5 in conjunction with each other. In other words, the example operations can at least partially overlap. For instance, the service worker can detect input of data into a web page and designate the data for DLP scanning, intercept a request from the web browser that retrieved the web page, determine the user associated with the session based on a cache lookup, modify the request to attach custom headers with the user information and result of the DLP scanning, and forward the modified request to the cybersecurity appliance. The cybersecurity appliance thus receives both the result of DLP scanning and the indication of the user logged into the SaaS application during the session which the request is associated and can enforce a security policy accordingly.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
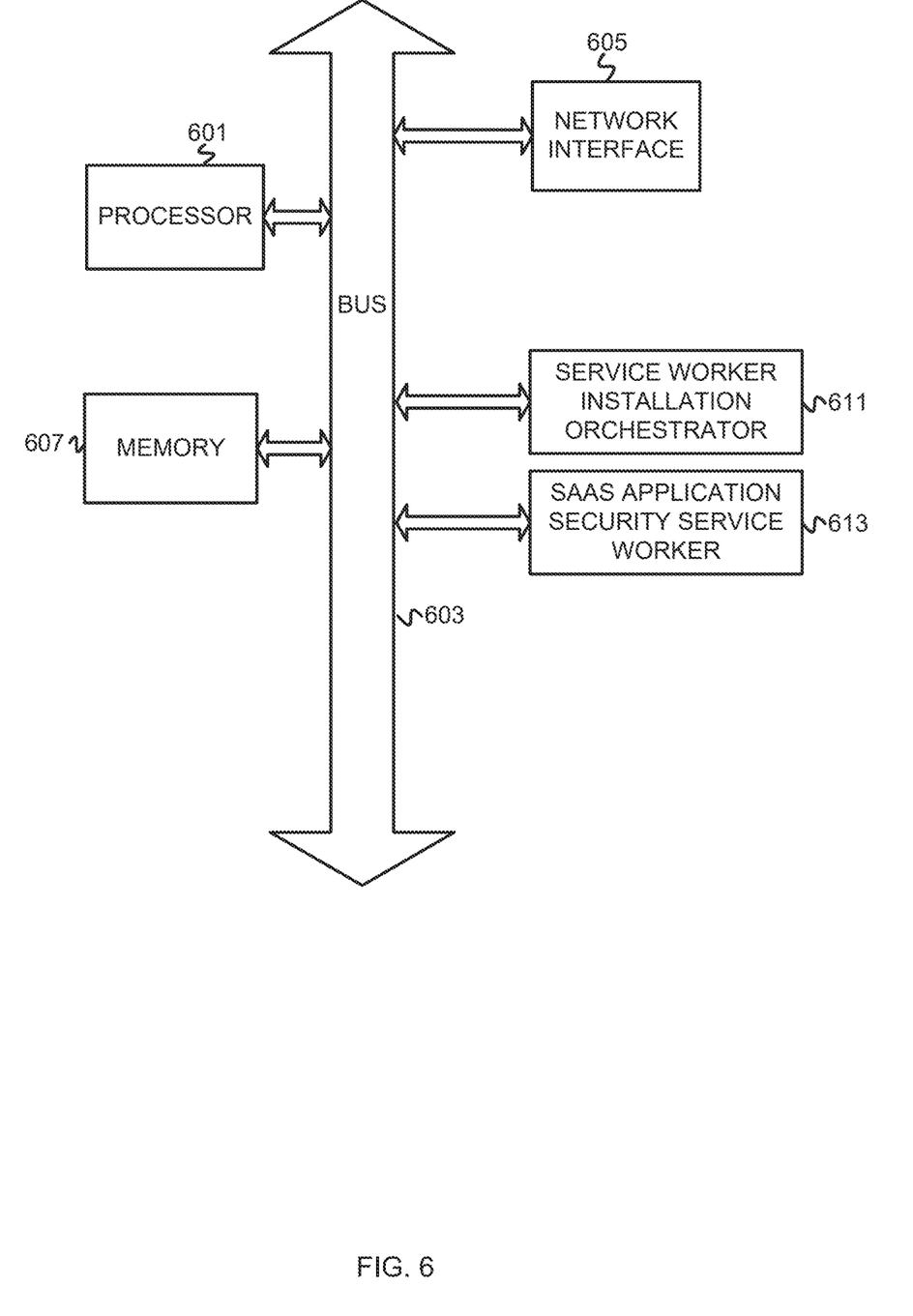
FIG. 6 depicts an example computer system with a service worker installation orchestrator and a SaaS application security service worker.

FIG. 6 depicts an example computer system with a service worker installation orchestrator and a SaaS application security service worker. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes service worker installation orchestrator 611 and SaaS application security service worker 613. The service worker installation orchestrator 611 orchestrates installation of the SaaS application security service worker 613 by a web browser based on intercepting and modifying responses to requests sent by the web browser. The SaaS application security service worker 613 determines user information associated with SaaS application sessions and incorporates the user information into intercepted requests sent by the web browser. The SaaS application security service worker 613 also monitors for input of data into web pages of the SaaS application, designates input data for DLP scanning, and incorporates results of the DLP scanning into intercepted requests sent by the web browser. While depicted as part of the same computer system in FIG. 6, the service worker installation orchestrator 611 and SaaS application security service worker 613 do not necessarily execute as part of the same system. Generally, the service worker installation orchestrator 611 executes on a cybersecurity appliance (e.g., a firewall), and the SaaS application security service worker 613 executes on a client device. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
    detecting, by a cybersecurity appliance, a first Hypertext Transfer Protocol (HTTP) request for a resource of a Software-as-a-Service (SaaS) application sent by a web browser during a first session with the SaaS application;
    injecting an element into a first HTTP response to the first HTTP request, wherein the element indicates a file corresponding to a service worker;
    registering and installing, by the web browser, the service worker, wherein the service worker intercepts and modifies requests sent by the web browser; and
    intercepting subsequent HTTP requests for resources of the SaaS application sent by the web browser and modifying the subsequent HTTP requests, wherein modifying the subsequent HTTP requests comprises at least one of modifying the subsequent HTTP requests to identify a user of the SaaS application associated with the first session and modifying the subsequent HTTP requests to indicate results of data loss prevention (DLP) scanning of data input to the SaaS application.

2. The method of claim 1 further comprising:
    based on monitoring, by the service worker, one or more input fields of a web page of the SaaS application, detecting data input into a first input field of the one or more input fields;
    designating the data input into the first input field for DLP scanning; and
    obtaining a result of DLP scanning of the data.

3. The method of claim 2, wherein modifying the subsequent HTTP requests to indicate results of DLP scanning comprises modifying one of the subsequent HTTP requests sent by the web browser to indicate the result of the DLP scanning.

4. The method of claim 1 further comprising:
    determining, by the service worker, the user associated with the first session; and
    caching an indication of the user,
    wherein modifying the subsequent HTTP requests to indicate the user of the SaaS application comprises modifying the subsequent HTTP requests sent during the first session with the indication of the user.

5. The method of claim 4, wherein determining the user associated with the first session comprises determining at least one of an account and a user identifier of the user logged in for the first session, wherein the indication of the user comprises at least one of an indication of the account and the user identifier.

6. The method of claim 1, wherein modifying the subsequent requests comprises appending one or more custom headers to each of the subsequent HTTP requests, wherein the one or more custom headers indicate the at least one of the user of the SaaS application and one of the results of DLP scanning of data input to the SaaS application.

7. The method of claim 1 further comprising:
    detecting a second HTTP request sent by the web browser, wherein the second HTTP request indicates a uniform resource locator (URL) of the file corresponding to the service worker; and
    modifying a second HTTP response to the second HTTP request with program code to register the service worker,
    wherein registering and installing the service worker is based on the web browser obtaining the second HTTP response.

8. The method of claim 1, wherein injecting the element into the first HTTP response comprises injecting a script tag indicating a uniform resource locator (URL) of a JavaScript file of the service worker.

9. One or more non-transitory machine-readable media having program code stored thereon, the program code comprising instructions to:
    detect a first request for a resource of a Software-as-a-Service (SaaS) application sent by a web browser during a first session with the SaaS application;
    inject, into an obtained response to the first request, an element that indicates a file corresponding to a service worker, wherein the service worker comprises program code to intercept requests sent by the web browser and modify the requests to indicate at least one of a user and results of data loss prevention (DLP) scanning of data input to the SaaS application; and
    for each request of one or more subsequent requests sent by the web browser,
        determine from the request at least one of a first user associated with the request and a result of DLP scanning of data included in the request; and
        enforce a security policy based on at least one of the first user associated with the request and the result of DLP scanning.

10. The non-transitory machine-readable media of claim 9, wherein the instructions to inject the element that indicates the file corresponding to the service worker comprise instructions to inject a script tag indicating a uniform resource locator (URL) of a JavaScript file of the service worker.

11. The non-transitory machine-readable media of claim 9, wherein each request of the one or more subsequent requests comprises a Hypertext Transfer Protocol (HTTP) request, wherein the instructions to determine from the request at least one of the first user and the result of DLP scanning comprises determining at least one of the first user and the result of DLP scanning from one or more custom headers attached to the HTTP request.

12. The non-transitory machine-readable media of claim 9, wherein the program code further comprises instructions to, based on detection of a second request for the file corresponding to the service worker, inject program code that registers the service worker for the web browser into an obtained response to the second request.

13. A system comprising:
    a cybersecurity appliance comprising a first processor and a first machine-readable medium, wherein the first machine-readable medium has instructions stored thereon that are executable by the first processor to cause the cybersecurity appliance to,
        detect a first Hypertext Transfer Protocol (HTTP) request for a resource of an application sent during a first session with the application; and
        based on retrieval of a first HTTP response to the first HTTP request, embed into the first HTTP response a script that indicates a file corresponding to a service worker; and
    a client device comprising a second processor and a second machine-readable medium, wherein the second machine-readable medium has instructions stored thereon that are executable by the second processor to cause the client device to,
    based on receipt the first HTTP response, register and install the service worker; and
    intercept subsequent HTTP requests for resources of the application and modify the subsequent HTTP requests to append to each of the subsequent HTTP requests at least one of an indication of a user associated with the first session and a data loss prevention (DLP) scanning verdict for data input to the application.

14. The system of claim 13, further comprising instructions executable by the second processor to cause the client device to,
    detect input of data into a first of one or more data fields of a web page of the application;
    designate the data input into the first data field for DLP scanning; and
    obtain a verdict of DLP scanning of the data.

15. The system of claim 14, wherein the instructions executable by the second processor to cause the client device to modify the subsequent HTTP requests comprise instructions executable by the second processor to cause the client device to modify one of the subsequent HTTP requests to indicate the verdict of the DLP scanning.

16. The system of claim 13, further comprising instructions executable by the second processor to cause the client device to,
    determine the user associated with the first session; and
    cache the indication of the user in association with an identifier of the first session,
    wherein the instructions executable by the second processor to cause the client device to modify the subsequent HTTP requests comprise instructions executable by the second processor to cause the client device to modify the subsequent HTTP requests sent during the first session to append the indication of the user to each of the subsequent HTTP requests.

17. The system of claim 16, wherein the instructions executable by the second processor to cause the client device to determine the user associated with the first session comprise instructions executable by the second processor to cause the client device to determine at least one of an account and a user identifier associated with the first session, wherein the indication of the user comprises at least one of a name of the account and the user identifier.

18. The system of claim 13, wherein the instructions executable by the second processor to cause the client device to modify the subsequent HTTP requests comprise instructions executable by the second processor to cause the client device to append one or more custom headers to each of the subsequent HTTP requests, wherein the one or more custom headers comprise at least one of the indication of the user and the DLP scanning verdict.

19. The system of claim 13 further comprising instructions executable by the first processor to cause the cybersecurity appliance to:
    detect a second HTTP request that indicates a uniform resource locator (URL) of the file corresponding to the service worker; and
    modify a second HTTP response to the second HTTP request with program code to register the service worker.

20. The system of claim 13, wherein the instructions executable by the second processor to cause the client device to embed the script into the first HTTP response comprise instructions executable by the second processor to cause the client device to insert into the first HTTP response a script tag indicating a uniform resource locator (URL) of a JavaScript file of the service worker.

* * * * *